United States Patent
Zuo et al.

(10) Patent No.: US 12,284,605 B2
(45) Date of Patent: Apr. 22, 2025

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Zhisong Zuo, Guangdong (CN); Shukun Wang, Guangdong (CN); Weijie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 369 days.

(21) Appl. No.: 17/937,560

(22) Filed: Oct. 3, 2022

(65) Prior Publication Data

US 2023/0033231 A1    Feb. 2, 2023

Related U.S. Application Data

(63) Continuation of application No. PCT/CN2020/084006, filed on Apr. 9, 2020.

(51) Int. Cl.
*H04W 48/18*     (2009.01)
*H04W 8/24*      (2009.01)
*H04W 48/10*     (2009.01)

(52) U.S. Cl.
CPC ............. *H04W 48/18* (2013.01); *H04W 8/24* (2013.01); *H04W 48/10* (2013.01)

(58) Field of Classification Search
CPC ....... H04W 48/18; H04W 8/24; H04W 48/02; H04W 8/22; H04W 48/10; H04W 48/12
See application file for complete search history.

(56) References Cited

U.S. PATENT DOCUMENTS

| 2019/0230499 | A1  | 7/2019  | Sun et al. |
| 2020/0100099 | A1  | 3/2020  | Tenny et al. |
| 2020/0260376 | A1* | 8/2020  | Islam ................ H04W 52/0212 |
| 2021/0368426 | A1* | 11/2021 | Wang .................... H04W 48/12 |

FOREIGN PATENT DOCUMENTS

| CN | 101009906 | 8/2007 |
| CN | 101616493 | 12/2009 |
| CN | 102045810 | 5/2011 |
| CN | 102118833 | 7/2011 |
| CN | 107624252 | 1/2018 |

(Continued)

OTHER PUBLICATIONS

Ericsson, "New SID on support of reduced capability NR devices," 3GPP TSG RAN Meeting #86, RP-193238, Dec. 2019.

(Continued)

*Primary Examiner* — Congvan Tran
(74) *Attorney, Agent, or Firm* — Hodgson Russ LLP

(57) ABSTRACT

The embodiments of the present application provide a wireless communication method, including: receiving, by a terminal device, first information broadcast by a first network; wherein the first information includes a capability level threshold and/or a type of a device prohibited or allowed to access the first network; the first information is configured to restrict access to the first network.

19 Claims, 5 Drawing Sheets

(56) References Cited

FOREIGN PATENT DOCUMENTS

| CN | 107852667 | 3/2018 |
|---|---|---|
| CN | 110505707 | 11/2019 |
| CN | 110545583 | 12/2019 |
| CN | 110740008 | 1/2020 |
| EP | 2683201 | 12/2017 |
| WO | 2007085172 | 8/2007 |

OTHER PUBLICATIONS

EPO, Extended European Search Report for EP Application No. 20930633.1, May 8, 2023.
Huawei Device et al., "Introduction of the Overheating Indication," 3GPP TSG-RAN WG2 Meeting #99bis, R2-1710558, Oct. 2017.
WIPO, International Search Report and Written Opinion for PCT/CN2020/084006, Jan. 4, 2021.
CNIPA, First Office Action for CN Application No. 202211652201.0, Jun. 15, 2024.
CNIPA, Request for Priority Examination for CN Application No. 202211652201.0, May 14, 2024.
CNIPA, Second Office Action for CN Application No. 202211652201.0, Oct. 30, 2024.

\* cited by examiner

WIRELESS COMMUNICATION METHOD, TERMINAL DEVICE, AND NETWORK DEVICE

CROSS REFERENCE

The present application is a continuation of International Patent Application No. PCT/CN2020/084006, filed Apr. 9, 2020, the entire disclosure of which is incorporated herein by reference.

TECHNICAL FIELD

The present disclosure relates to the field of communication technologies, and in particular to a wireless communication method, a terminal device, and a network device.

BACKGROUND

In new radio (NR) and long term evolution (LTE) systems, network devices can indiscriminately restrict user devices to access the network by broadcasting messages. However, as the new generation of wireless communication technology evolves to Internet of Things (IoT) technology, the performance of terminal devices in terms of coverage, throughput, and latency has been reduced in some scenarios. While the network devices still indiscriminately restrict the user devices to access the network through broadcast messages, network performance may be degraded, thus affecting user experience.

SUMMARY OF THE DISCLOSURE

In a first aspect, the present disclosure provides a wireless communication method, including: receiving, by a terminal device, first information broadcast by a first network; wherein the first information includes a capability level threshold and/or a type of a device prohibited or allowed to access the first network; the first information is configured to restrict access to the first network.

In a second aspect, the present disclosure provides a terminal device, including a processor and a memory; wherein the memory is configured to store a computer program, and the processor is configured to call and run the computer program stored in the memory to perform the method in the first aspect.

In a third aspect, the present disclosure provides a network device, including a processor and a memory; wherein the memory is configured to store a computer program, and the processor is configured to call and run the computer program stored in the memory to perform broadcasting, by the network device in a first network, first information; wherein the first information includes a capability level threshold and/or a type of a device prohibited or allowed to access the first network; the first information is configured to restrict access to the first network.

DETAILED DESCRIPTION

The technical solutions in the embodiments of the present disclosure will be described below in conjunction with the accompanying drawings in the embodiments of the present disclosure. Obviously, the embodiments described are a part of the embodiments of the present disclosure, and not all of them. With respect to the embodiments in the present disclosure, all other embodiments obtained by those skilled in the art without making creative labor fall within the scope of the present disclosure.

The embodiments of the present disclosure may be applied to various communication systems, such as: global system of mobile communication (GSM), code division multiple access (CDMA) system, wideband code division multiple access (WCDMA) system, general packet radio service (GPRS), Long Term Evolution (LTE) system, advanced long term evolution (LTE-A) system, new radio (NR) system, evolutionary system for NR system, LTE-based access to unlicensed spectrum (LTE-U) system, NR-based access to unlicensed spectrum (NR-U) system, universal mobile telecommunication system (UMTS), wireless local area networks (WLAN), wireless fidelity (Wi-Fi), next generation communication system (NGCS), etc.

Generally, conventional communication systems support a limited number of connections and are easy to implement. However, with the development of communication technologies, mobile communication systems will support not only traditional communication but also, for example, device-to-device (D2D) communication, machine-to-machine (M2M) communication, machine-type communication (MTC), vehicle to vehicle (V2V) communication, etc., and the embodiments of the present disclosure may also be applied to these communication systems.

In some embodiments, the communication system in the embodiments of the present disclosure may be applied in a carrier aggregation (CA) scenario, a dual connectivity (DC) scenario, and a standalone (SA) deployment scenario.

The embodiments of the present disclosure are not limited to the applied spectrum. For example, the embodiments of the present disclosure may be applied to licensed spectrum or to unlicensed spectrum.

Figure 1:
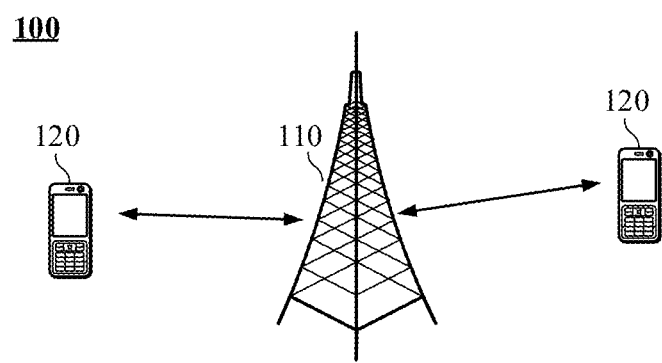
FIG. 1 is a schematic view of a communication system architecture according to an embodiment of the present disclosure.

Exemplarily, a communication system 100 applied in the embodiments of the present disclosure is shown in FIG. 1. The communication system 100 may include a network device 110, and the network device 110 may be a device that communicates with a terminal device 120 (or referred to as a communication terminal or terminal). The network device 110 may provide communication coverage for a specific geographic region and may communicate with terminal devices located within the coverage region.

FIG. 1 exemplarily illustrates one network device and two terminal devices. In some embodiments, the communication system 100 may include multiple network devices and other numbers of terminal devices may be included within the coverage region of each network device, without limitation in the embodiments of the present disclosure.

In some embodiments, the communication system 100 may further include other network entities such as a network controller, a mobile management entity, etc., without limitation in the embodiments of the present disclosure.

It is to be understood that devices with communication functions in the network/system in the embodiments of the present disclosure may be referred to as communication devices. Taking the communication system 100 illustrated in FIG. 1 as an example, the communication devices may include the network device 110 and terminal device 120 with communication functions, and the network device 110 and terminal device 120 may be specific devices as described above and will not be described herein. The communication devices may further include other devices in the communication system 100, such as a network controller, a mobile management entity, and other network entities, which are not limited in the embodiments of the present disclosure.

It is to be understood that the terms "system" and "network" may be used interchangeably in this document. The term "and/or" is only a description of an association relationship of associated objects, indicating that three relationships may exist, for example, A and/or B, which may indicate: the existence of A alone, the existence of both A and B, and the existence of B alone. In addition, the character "/" generally indicates that the front and rear associated objects are in an "or" relationship.

The present disclosure describes each embodiment in conjunction with the terminal device and the network device. The terminal device may also be referred to as user equipment (UE), an access terminal, a user unit, a user station, a mobile platform, a mobile station, a remote station, a remote terminal, a mobile device, a user terminal, a terminal, a wireless communication device, a user agent, a user device, etc. The terminal device may be a station (ST) in WLAN, a cellular telephone, a cordless telephone, a session initiation protocol (SIP) telephone, a wireless local loop (WLL) station, a personal digital assistant (PDA) device, a handheld device with wireless communication capabilities, a computing device or other processing devices connected to a wireless modem, an in-vehicle device, a wearable device, a terminal in next-generation communication systems, such as NR network, a terminal in future evolved public land mobile network (PLMN), etc.

By way of examples and not limitation, in the embodiments of the present disclosure, the terminal device may also be a wearable device. A wearable device may be called a wearable smart device, which is a general term for a device that can be worn by applying wearable technology to intelligently design and develop everyday wear, such as glasses, gloves, watches, clothing, shoes, etc. The wearable device is a portable device that is worn directly on the body or integrated into the user's clothing or accessories. The wearable device is not only a hardware device, but also performs a powerful function through software support as well as data interaction and cloud interaction. Broadly speaking, the wearable smart device includes full-featured, large-sized devices that can achieve complete or partial functions without relying on smartphones, such as smart watches or smart glasses; and includes devices that focus only on a certain type of application function and need to be used in conjunction with other devices such as smartphones, such as various types of smart bracelets and smart jewelry for physical signs monitoring.

The network device may be configured to communicate with mobile devices. The network device may be an access point (AP) in WLAN, a base transceiver station (BTS) in GSM or CDMA, a base station (NodeB, NB) in WCDMA, an evolutional base station (Evolutional Node B, eNB, or eNodeB) in LTE, a relay station or access point, an in-vehicle device, a wearable device, a network device or a base station (gNB) in NR network, a network device in future evolved PLMN, etc.

In the embodiments, the network device provides service to a cell, and the terminal device communicates with the network device through transmission resources (e.g., frequency domain resources, or spectrum resources) used by the cell. The cell may correspond to the network device (e.g., base station), and the cell may belong to a macro base station or a base station corresponding to a small cell. The small cell may include a Metro cell, a Micro cell, a Pico cell, a Femto cell, etc. These small cells have characteristics of small coverage range and low transmitting power, which are suitable for providing high-speed data transmission services.

Figure 2:
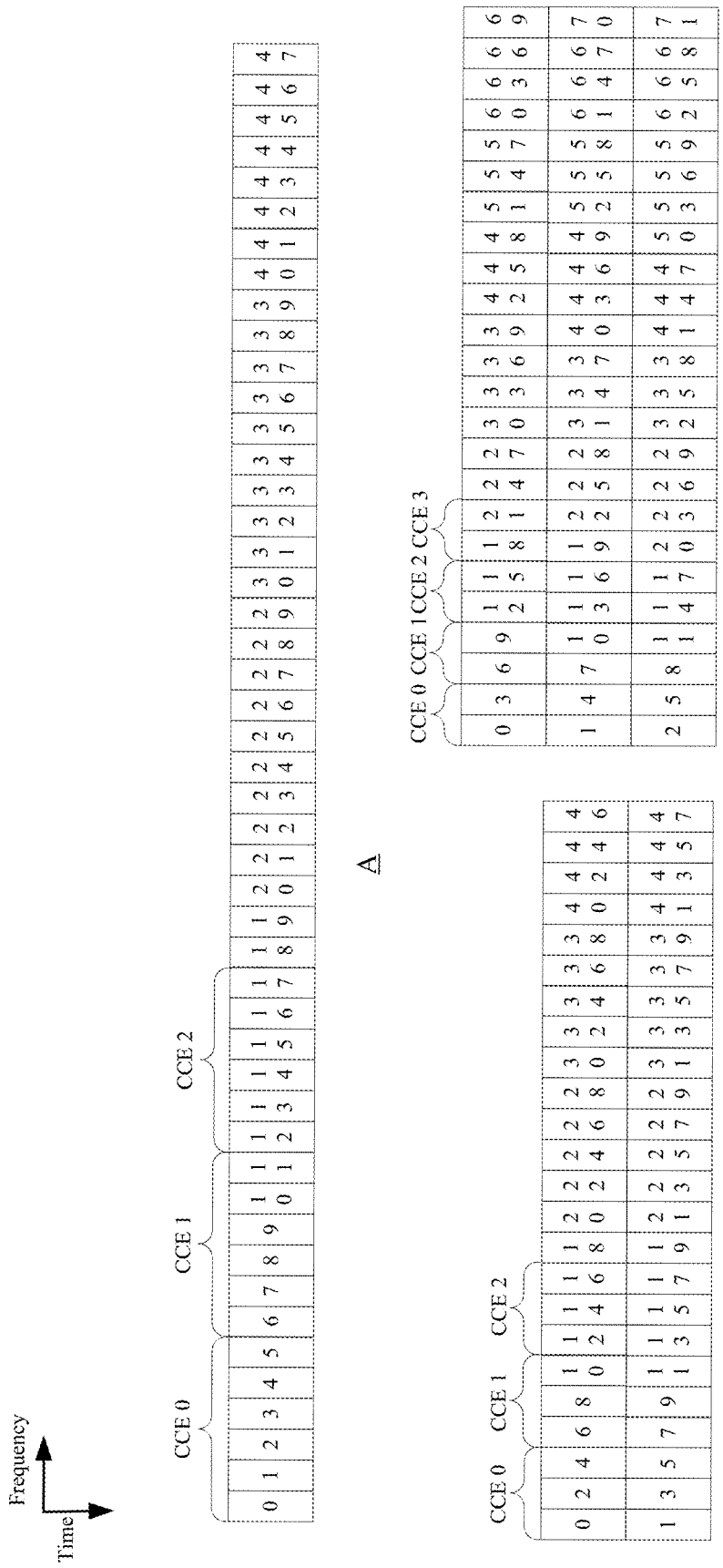
FIG. 2 is a schematic view of a CCE pattern according to an embodiment of the present disclosure.

It should be noted that the processing capability of the terminal device in NR wireless communication technology shall meet the processing capability of maximum bandwidth at the frequency point where the terminal device is located. At frequency points below 2500 MHz, the antenna of the NR terminal device shall include one transmitting antenna and two receiving antennas. At higher frequency points (e.g., above 2500 MHz), 4 receiving antennas are mandatory for the NR terminal device. The decoding capability of the control channel of the NR terminal device is required to be high: for subcarrier spacing (SCS) with frame structure of 15 kHz and 30 kHz, 56 control channel element (CCE) channel estimates are required inside a time slot; for SCS with frame structure of 60 kHz, 48 CCE channel estimates are required in a time slot; for SCS with frame structure of 120 kHz, 32 CCE channel estimates are required in a time slot. For example, as shown in FIG. 2, CCE may be used as a unit of channel estimation for the downlink control channel. Three CCE patterns, such as A, B, and C, are shown in FIG. 2. In addition, the NR terminal device further requires that a time interval between the physical downlink control channel (PDCCH) and the scheduled physical downlink shared channel (PDSCH) is within a certain number of orthogonal frequency-division multiplexing (OFDM) symbols, and a time interval between the PDCCH and the scheduled Physical Uplink Shared Channel (PUSCH) is within the certain number. For example, as shown in Table 1 below, the time interval between the PDCCH and the scheduled PDSCH may be within a certain number of OFDM symbols, which is distinguished by the fact that the PDSCH has only a fore-demodulation reference signal (DMRS) and the PDSCH has an additional DMRS.

TABLE 1

| | PDSCH decoding time $N_1$ [Unit: Symbol] | |
|---|---|---|
| SCS | PDSCH with only fore-DRMS | PDSCH with additional DMRS |
| 15 kHz | 8 | (configured value) $N_{1,0}$ |
| 30 kHz | 10 | 13 |

TABLE 1-continued

| | PDSCH decoding time $N_1$ [Unit: Symbol] | |
|---|---|---|
| SCS | PDSCH with only fore-DRMS | PDSCH with additional DMRS |
| 60 kHz | 17 | 20 |
| 120 kHz | 20 | 24 |

It is further noted that the next generation of wireless communication technology is evolving towards Internet of Things (IoT) technology. Series of standards promoted by 3rd generation partnership project (3GPP), such as development of machine type of communication (MTC), evolved machine type of communication (eMTC), and narrowband Internet of Things (NB-IoT), have become a candidate technical standard for 5G mass machine communication technology acknowledged by international telecommunication union (ITU). These technologies significantly reduce the hardware complexity, data throughput and processing speed of terminals, which are suitable for some less demanding smart home, smart city, smart factory, remote monitoring, and smart transportation application scenarios.

The 3GPP organization has also promoted another communication technology with low latency and high reliability for some key communication scenarios. This type of terminal is a NR-based ultra-reliable and low latency communication (URLLC) terminal, which may be applied to some IoT scenarios that require extremely low latency and high communication reliability, such as video surveillance in smart security, low latency industrial implementation control, and smart driving. These requirements are different for ordinary NR terminals. As a key communication technology for ITU 5G, the cost of URLLC terminals is greater than that of ordinary NR terminals.

In between the above-mentioned mass machine communication, key communication and normal NR terminals, NR still lacks terminals that define some other performance levels. Therefore, new levels of terminals are introduced to improve the terminal system of 5G and better apply to diversified vertical industries. 3GPP is considering an introduction of reduced capability terminals that support medium transmission rates and medium latency requirements at relatively low cost. The reduced terminal complexity is achieved mainly from the perspective of reducing the supported bandwidth, number of transceiver antennas, device size and processing complexity. Due to the reduced performance of reduced capability terminals for coverage, throughput, and latency, some networks may not serve such terminals.

In NR and LTE systems, the network device can indiscriminately restrict the user device access to the network by broadcasting messages, and the access restriction is independent of the terminal performance. In addition, the terminal device cannot report information about performance limitations, nor can it report information about multiple sets of capabilities, nor can it configure a certain capability by the network side to bring the terminal device into a specific low-complexity processing mode.

Based on the above problems, the present disclosure proposes a scheme for accessing a network in which network devices can restrict the selection of access to the network by broadcasting capability levels.

The technical solutions of the present disclosure are detailed below through specific embodiments.

Figure 3:
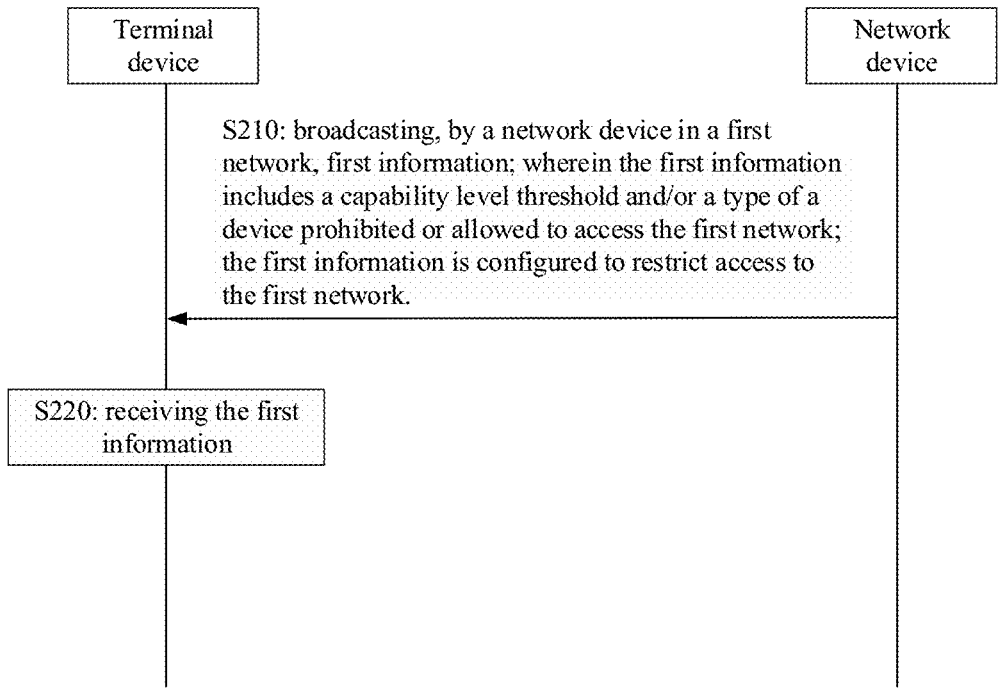
FIG. 3 is a flowchart of a wireless communication method according to an embodiment of the present disclosure.

FIG. 3 is a schematic flowchart of a wireless communication method 200 according to embodiments of the present disclosure. The method may include, but is not limited to, operations at blocks illustrated in FIG. 3.

At block S210: broadcasting, by a network device in a first network, first information; wherein the first information includes a capability level threshold and/or a type of a device prohibited or allowed to access the first network; the first information is configured to restrict access to the first network.

At block S220: receiving, by a terminal device, the first information broadcast by the first network.

In the embodiments, the first network restricts certain types of terminal devices from accessing the first network by broadcasting the first information. That is, the network device prohibits or reduces the access of certain types of terminal devices to the network by broadcasting messages.

It should be noted that in the embodiments, the terminal device may, for example, be a reduced capability terminal, which supports both medium transmission rate and medium latency requirements and has a relatively low cost with reduced performance in terms of coverage, throughput, latency, etc. In addition, in the embodiments, the terminal device may also be, for example, a terminal with multiple capabilities, which has the ability to operate in multiple complexity processing modes and may be configured by the network to operate in a specific complexity processing mode.

As Embodiment 1, this first information includes the capability level threshold.

In Embodiment 1, in some embodiments, in response to a capability level of the terminal device being less than the capability level threshold, the terminal device prioritizes not to access the first network, or the terminal device expects the first network not to provide a service higher than the capability level of the terminal device.

It is noted that the terminal device prioritizing not to access the first network may mean that the terminal device does not prioritize an initial access operation at that first network. Further, the terminal device expecting the first network not to provide a service higher than the capability level of the terminal device may mean that the terminal device does not expect a configuration higher than the reported capability when receiving configuration.

Accordingly, for the network device, in Embodiment 1, the first information is specifically configured to indicate the terminal device to prioritize not to access the first network when the capability level is less than the capability level threshold, or the first information is configured to indicate the terminal device to expect the first network not to provide a service higher than the capability level of the terminal device when the capability level is less than the capability level threshold.

In Embodiment 1, in some embodiments, in response to the capability level threshold included in the first information being defaulted, when the capability level of the terminal device is less than a first capability level, the terminal device prioritizes not to access the first network, or the terminal device expects the first network not to provide a service higher than the capability level of the terminal device.

Accordingly, for the network device, in Embodiment 1, in response to the capability level threshold included in the first information being defaulted, when the capability level is less than the first capability level, the first information is configured to indicate the terminal device to prioritize not to access the first network, or the first information is configured to indicate the terminal device to expect the first network not to provide a service higher than the capability level of the capability level of the terminal device.

In some embodiments, the first capability level is pre-configured. That is, the first capability level is information that is pre-configured at the terminal device.

In some embodiments, the first capability level is the highest capability level of the terminal device.

In Embodiment 1, in some embodiments, the capability level includes at least one of the followings.

A gain level of a receiving antenna, a gain level of a transmitting antenna, a size level of the terminal device, a size level of the receiving antenna, and a size level of the transmitting antenna.

In Embodiment 1, in some embodiments, the gain levels of the receive and transmitting antennas may, for example, be as shown in Table 2 below, or as shown in Table 3 below.

TABLE 2

| Capability level | Reduction value of antenna gains | |
|---|---|---|
| | Receiving antenna | Transmitting antenna |
| 1 | 0 dB | 0 dB |
| 2 | −3 dB | −3 dB |
| 3 | −6 dB | −6 dB |
| 4 | −12 dB | −12 dB |

TABLE 3

| Capability level | Antenna gain/power | |
|---|---|---|
| | Receiving antenna | Transmitting antenna |
| 1 | 5 dBi | 23 dBm |
| 2 | 4 dBi | 20 dBm |
| 3 | 3 dBi | 17 dBm |
| 4 | 2 dBi | 14 dBm |

It is to be noted that the values taken for the receiving antenna and transmitting antenna in the respective capability levels in Tables 2 and 3 above are only examples of implementation and do not constitute a limitation to the specific solutions in the present disclosure.

It should also be noted that the dimensions in the capability level may be independent, as indicated by the separate transmit and receive (transceiver) antenna gain levels in Table 2 and Table 3 above. In addition, the capability level may be extended to terminal device size, transceiver antenna size, and to power consumption (e.g., power consumption of RF and baseband as a whole), peak rate (e.g., peak rate of reception, peak rate of transmission, etc.), bandwidth (e.g., reception bandwidth, transmission bandwidth, etc.), and other types, which are not limited by the present disclosure.

In Embodiment 1, in some embodiments, the first information is master information block (MIB) information or system information block (SIB) information of a physical broadcast channel (PBCH).

In Embodiment 1, in some embodiments, the capability level threshold is indicated by at least one bit of an extended domain in the MIB information or the SIB information.

For example, an extended reduced capability bar domain in the SIB information is a reduced capability bar domain. The reduced capability bar domain may use at least one bit to prohibit access to different capability levels, such as taking a value of 2, to prohibit access to the network for terminal devices with capability levels below 2. Further, when the reduced capability bar domain in the SIB infor-mation is defaulted, terminal devices below a certain level (e.g., the highest level) are prohibited from accessing the network.

As Embodiment 2, the first information includes the type of device that is prohibited or allowed to access the first network.

In Embodiment 2, the terminal device determines whether to access the first network based on the first information. Accordingly, for the network device, in Embodiment 2, this first information is configured for the terminal device to determine whether to access the first network.

It is noted that in some scenarios, the above scenarios of Embodiment 1 and Embodiment 2 may be combined, i.e., the first information includes the capability level threshold, and includes the type of device that is prohibited or allowed to access the first network.

In some embodiments, when a first timer expires, the terminal device re-reads the first information broadcast by the first network. Accordingly, when the first timer expires, the network device re-broadcasts the first information.

In some embodiments, the first timer is pre-configured, or the first timer is indicated by the first information, or the first timer is pre-configured for the terminal device by the network device in the first network.

In some embodiments, after the terminal device is connected to the first network, the terminal device sends capability information to the network device in the first network. For example, the capability information may report information that the terminal device is performance reduced.

The capability information may include at least one of the followings.

At least one set of transmitting capability loss values, at least one set of receiving capability loss values, at least one set of blind detections per unit time for a control channel, and at least one set of channel estimations per unit time for a control channel element.

That is, in the embodiments, the terminal device can report multiple sets of capability values by reporting the capability information, to assist the network device in performing the relevant configuration for the terminal device.

It should be noted that the transmitting capability loss value included in the capability information may be specifically the gain reduction value corresponding to the transmitting antenna in Table 2 above, or the transmitting capability loss value included in the capability information may be specifically the antenna gain or power corresponding to the transmitting antenna in Table 3 above. Similarly, the receiving capability loss value included in the capability information may be specifically the gain reduction value corresponding to the receiving antenna in Table 2 above, or the receiving capability loss value included in the capability information may be specifically the antenna gain or power corresponding to the receiving antenna in Table 3 above.

In some embodiments, the number of blind detections per unit time for the control channel is related to a frame structure parameter, and/or, the number of channel estimates per unit time for the control channel element is related to the frame structure parameter.

For example, the frame structure parameter is a subcarrier spacing (SCS).

It should be noted that for the number of blind detections per unit time for the control channel being related to the frame structure parameter, for example, for 15 kHz SCS, the terminal device can perform w blind detections of the control channel in a time slot; for 30 kHz SCS, the terminal device can perform x blind detections of the control channel in a time slot; for 60 kHz SCS, the terminal device can perform y blind detections of the control channel in a time slot; for 120 kHz SCS, the user can perform z blind detections of the control channel in a time slot.

It should also be noted that for the number of channel estimates per unit time for the control channel element (CCE) being related to the frame structure parameters, for example, for 15 kHz SCS, the terminal equipment can perform a CCE channel estimates in a time slot; for 30 kHz SCS, the terminal equipment can perform b CCE channel estimates in a time slot; for 60 kHz SCS, the terminal device may perform c CCE channel estimates at a slot; for 120 kHz SCS, the terminal device may perform d CCE channel estimates in a time slot.

In some embodiments, the terminal device receives configuration information sent by the network device, the configuration information being determined based on the capability information. The terminal device performs reception and/or detection of a signal according to the configuration information.

Accordingly, after the network device receives the capability information, in response to the capability information, the network device sends the configuration information to the terminal device. The configuration information is configured for the terminal device to perform the reception and/or detection of the signal.

That is, in the embodiments, the terminal device can report multiple sets of capability values by reporting the capability information, and the network device can configure the relevant capability values for the terminal device according to the capability information reported by the terminal device, thereby enabling the terminal device to enter a specific processing mode, such as entering a low-complexity processing mode.

It is to be noted that the configuration information is determined based on the capability information, specifically it may be understood that the network device determines the configuration information with reference to the capability information reported by the terminal device, such that the terminal device performs reception and/or detection of the signal according to the configuration information. The configuration information being determined based on the capability information may be specifically understood as that, after receiving the capability information reported by the terminal device, the network device selects a set of capabilities of a certain category from the capability information.

In some embodiments, the configuration information is configured to indicate the terminal device to enable at least one of the followings.

One of the at least one set of transmitting capability loss values, one of the at least one set of receiving capability loss values, one of the at least one set of blind detections per unit time for the control channel, and one of the at least one set of channel estimations per unit time for the control channel element.

Specifically, for example, the capability information reported by the terminal device includes four types of capabilities, which are denoted as Class A capabilities, Class B capabilities, Class C capabilities, and Class D capabilities. The Class A capabilities are the transmitting capability loss values, and the capability information includes two sets of Class A capabilities. The Class B capabilities are the receiving capability loss values, and the capability information includes three sets of Class B capabilities. The Class C capabilities are the number of blind detections per unit time for the control channel, and the capability information includes two sets of Class C capabilities. The Class D capabilities are the number of channel estimates per unit time for the control channel element, and the capability information includes four sets of Class D capabilities. After receiving the capability information, the network device may, for example, indicate the terminal device to enable only a first set of Class A capabilities (i.e., the network device instructs the terminal device to enable only one type of capabilities in the capability information) by means of the configuration information. For another example, the network device may indicate the terminal device to enable a first set of Class A capabilities and a first set of Class D capabilities (i.e., the network device instructs the terminal device to enable some of the types of capabilities in the capability information). For further another example, the network device may indicate the terminal device to enable both a second set of Class A capabilities, a second set of Class B capabilities, a second set of Class C capabilities, and a second set of Class D capabilities (i.e., the network device instructs the terminal device to enable all the types of capabilities in the capability information). Further, the terminal device performs reception and/or detection of the signal according to the configuration information.

In some embodiments, the configuration information is carried in a specific domain of downlink control information (DCI) of the physical downlink control channel (PDCCH); or, the configuration information is carried in a higher level signaling such as radio resource control (RRC) signaling.

Therefore, in the embodiments of the present disclosure, the first network restricts access to the first network to certain types of terminal devices by broadcasting the first information. That is, the network device prohibits or reduces the access of certain types of terminal devices to the network by broadcasting messages. Further, the terminal device may report multiple sets of capability values by reporting the capability information to assist the network device in performing relevant configurations for the terminal device. The network device may configure the relevant capability values for the terminal devices according to the capability information reported by the terminal devices such that the terminal devices may be put into a specific processing mode, such as into a low-complexity processing mode.

Figure 4:
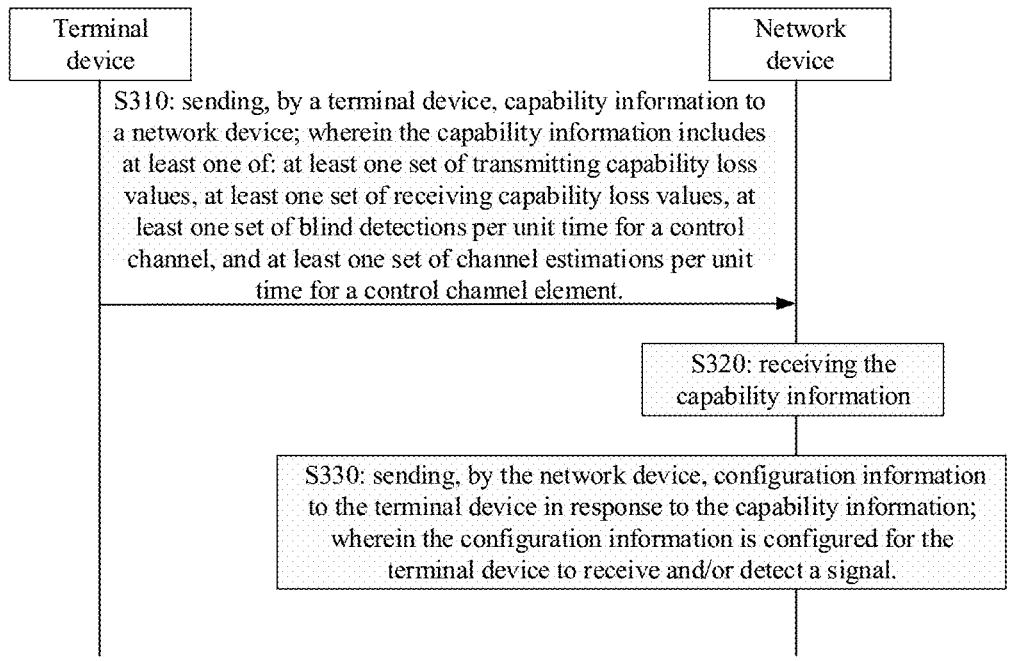
FIG. 4 is a flowchart of a wireless communication method according to another embodiment of the present disclosure.

FIG. 4 is a schematic flowchart of a wireless communication method 300 according to embodiments of the present disclosure. The method may include, but is not limited to, operations at blocks illustrated in FIG. 4.

At block S310: sending, by a terminal device, capability information to a network device; wherein the capability information includes at least one of: at least one set of transmitting capability loss values, at least one set of receiving capability loss values, at least one set of blind detections per unit time for a control channel, and at least one set of channel estimations per unit time for a control channel element.

At block S320: receiving, by the network device, the capability information sent by the terminal device.

At block S330: sending, by the network device, configuration information to the terminal device in response to the capability information; wherein the configuration information is configured for the terminal device to receive and/or detect a signal.

That is, in the embodiments, the terminal device can report multiple sets of capability values by reporting the capability information, to assist the network device in performing the relevant configuration for the terminal device.

It should be noted that the transmitting capability loss value included in the capability information may be specifically the gain reduction value corresponding to the transmitting antenna in Table 2 above, or the transmitting capability loss value included in the capability information may be specifically the antenna gain or power corresponding to the transmitting antenna in Table 3 above. Similarly, the receiving capability loss value included in the capability information may be specifically the gain reduction value corresponding to the receiving antenna in Table 2 above, or the receiving capability loss value included in the capability information may be specifically the antenna gain or power corresponding to the receiving antenna in Table 3 above.

In some embodiments, the number of blind detections per unit time for the control channel is related to a frame structure parameter, and/or, the number of channel estimates per unit time for the control channel element is related to the frame structure parameter.

In some embodiments, the frame structure parameter is an SCS.

It should be noted that for the number of blind detections per unit time for the control channel being related to the frame structure parameter, for example, for 15 kHz SCS, the terminal device can perform w blind detections of the control channel in a time slot; for 30 kHz SCS, the terminal device can perform x blind detections of the control channel in a time slot; for 60 kHz SCS, the terminal device can perform y blind detections of the control channel in a time slot; for 120 kHz SCS, the user can perform z blind detections of the control channel in a time slot.

It should also be noted that for the number of channel estimates per unit time for the control channel element (CCE) being related to the frame structure parameters, for example, for 15 kHz SCS, the terminal equipment can perform a CCE channel estimates in a time slot; for 30 kHz SCS, the terminal equipment can perform b CCE channel estimates in a time slot; for 60 kHz SCS, the terminal device may perform c CCE channel estimates at a slot; for 120 kHz SCS, the terminal device may perform d CCE channel estimates in a time slot.

In some embodiments, the terminal device receives configuration information sent by the network device, the configuration information being determined based on the capability information. The terminal device performs reception and/or detection of a signal according to the configuration information.

Accordingly, after the network device receives the capability information, in response to the capability information, the network device sends the configuration information to the terminal device. The configuration information is configured for the terminal device to perform the reception and/or detection of the signal.

That is, in the embodiments, the terminal device can report multiple sets of capability values by reporting the capability information, and the network device can configure the relevant capability values for the terminal device according to the capability information reported by the terminal device, thereby enabling the terminal device to enter a specific processing mode, such as entering a low-complexity processing mode.

It is to be noted that the configuration information is determined based on the capability information, specifically it may be understood that the network device determines the configuration information with reference to the capability information reported by the terminal device, such that the terminal device performs reception and/or detection of the signal according to the configuration information. The configuration information being determined based on the capability information may be specifically understood as that, after receiving the capability information reported by the terminal device, the network device selects a set of capabilities of a certain category from the capability information.

In some embodiments, the configuration information is configured to indicate the terminal device to enable at least one of the followings.

One of the at least one set of transmitting capability loss values, one of the at least one set of receiving capability loss values, one of the at least one set of blind detections per unit time for the control channel, and one of the at least one set of channel estimations per unit time for the control channel element.

Specifically, for example, the capability information reported by the terminal device includes four types of capabilities, which are denoted as Class A capabilities, Class B capabilities, Class C capabilities, and Class D capabilities. The Class A capabilities are the transmitting capability loss values, and the capability information includes two sets of Class A capabilities. The Class B capabilities are the receiving capability loss values, and the capability information includes three sets of Class B capabilities. The Class C capabilities are the number of blind detections per unit time for the control channel, and the capability information includes two sets of Class C capabilities. The Class D capabilities are the number of channel estimates per unit time for the control channel element, and the capability information includes four sets of Class D capabilities. After receiving the capability information, the network device may, for example, indicate the terminal device to enable only a first set of Class A capabilities (i.e., the network device instructs the terminal device to enable only one type of capabilities in the capability information) by means of the configuration information. For another example, the network device may indicate the terminal device to enable a first set of Class A capabilities and a first set of Class D capabilities (i.e., the network device instructs the terminal device to enable some of the types of capabilities in the capability information). For further another example, the network device may indicate the terminal device to enable both a second set of Class A capabilities, a second set of Class B capabilities, a second set of Class C capabilities, and a second set of Class D capabilities (i.e., the network device instructs the terminal device to enable all the types of capabilities in the capability information). Further, the terminal device performs reception and/or detection of the signal according to the configuration information.

In some embodiments, the configuration information is carried in a specific domain of DCI of the PDCCH; or, the configuration information is carried in a higher level signaling, such as RRC signaling.

Therefore, in the embodiments of the disclosure, the terminal device the terminal device may report multiple sets of capability values by reporting the capability information to assist the network device in performing relevant configurations for the terminal device. The network device may configure the relevant capability values for the terminal devices according to the capability information reported by the terminal devices such that the terminal devices may be put into a specific processing mode, such as into a low-complexity processing mode.

The method embodiments of the present disclosure are described in detail above in connection with FIGS. 3 through 4, and device embodiments of the present disclosure will be described in detail below in connection with FIGS. 5-11. It should be understood that the device embodiments and the method embodiments correspond to each other, and similar descriptions may refer to the method embodiments.

Figure 5:
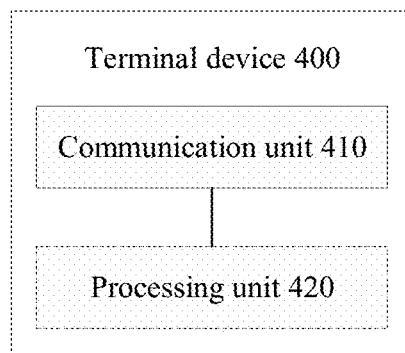
FIG. 5 is a schematic block view of a terminal device according to an embodiment of the present disclosure.

FIG. 5 illustrates a schematic block view of a terminal device 400 according to embodiments of the present disclosure. As shown in FIG. 5, the terminal device 400 includes following elements.

A communication unit 410 configured to receive first information broadcast by a first network; wherein the first information includes a capability level threshold and/or a type of a device prohibited or allowed to access the first network; the first information is configured to restrict access to the first network.

In some embodiments, the first information includes the capability level threshold.

The terminal device 400 further includes: a processing unit 420.

The processing unit 420 is configured to, in response to a capability level of the terminal device being less than the capability level threshold, prioritize not to access the first network or expect the first network not to provide a service higher than the capability level of the terminal device.

In some embodiments, the first information includes the capability level threshold, and the capability level threshold is defaulted.

The terminal device further includes: a processing unit 420.

The processing unit 420 is configured to, when the capability level is less than a first capability level, prioritize not to access the first network, or expect the first network not to provide a service higher than the capability level of the capability level of the terminal device.

In some embodiments, the first capability level is pre-configured.

In some embodiments, the first capability level is the highest capability level of the terminal device.

In some embodiments, the capability level includes at least one of the followings.

A gain level of a receiving antenna, a gain level of a transmitting antenna, a size level of the terminal device, a size level of the receiving antenna, and a size level of the transmitting antenna.

In some embodiments, the first information is MIB information or SIB information of a PBCH.

In some embodiments, the capability level threshold is indicated by at least one bit of an extended domain of the MIB information or the SIB information.

In some embodiments, the first information includes the type of device that is prohibited or allowed to access this first network.

The terminal device 400 further includes: a processing unit 420.

The processing unit 420 is configured to determine whether to access the first network based on the first information.

In some embodiments, the communication unit 410 is further configured to, when a first timer expires, re-read the first information broadcast by the first network.

In some embodiments, the first timer is pre-configured, or the first timer is indicated by the first information, or the first timer is pre-configured for the terminal device by the network device in the first network.

In some embodiments, after the terminal device is connected to that first network, the communication unit 410 is further configured to send capability information to the network device in the first network. The capability information may include at least one of the followings.

At least one set of transmitting capability loss values, at least one set of receiving capability loss values, at least one set of blind detections per unit time for a control channel, and at least one set of channel estimations per unit time for a control channel element.

In some embodiments, the number of blind detections per unit time for the control channel is related to a frame structure parameter, and/or, the number of channel estimates per unit time for the control channel element is related to the frame structure parameter.

In some embodiments, the frame structure parameter is an SCS.

In some embodiments, the terminal device 400 further includes: a processing unit 420.

The communication unit 410 is further configured to receive configuration information sent by the network device, the configuration information being determined based on the capability information.

The processing unit 420 is configured to receive and/or detect a signal according to the configuration information.

In some embodiments, the configuration information is configured to indicate the terminal device to enable at least one of the followings.

One of the at least one set of transmitting capability loss values, one of the at least one set of receiving capability loss values, one of the at least one set of blind detections per unit time for the control channel, and one of the at least one set of channel estimations per unit time for the control channel element.

In some embodiments, the configuration information is carried in a specific domain of DCI of the PDCCH; or, the configuration information is carried in RRC signaling.

In some embodiments, the communication unit may be a communication interface or transceiver, or an input-output interface of a communication chip or system-on-chip. The processing unit may be one or more processors.

It is to be understood that the terminal device 400 according to the embodiments of the present disclosure may correspond to the terminal device in the method embodiments of the present disclosure, and that the above and other operations and/or functions of the individual units in the terminal device 400 are respectively intended to implement the corresponding processes of the terminal device in the method 200 shown in FIG. 3, which will not be repeated herein for brevity.

Figure 6:
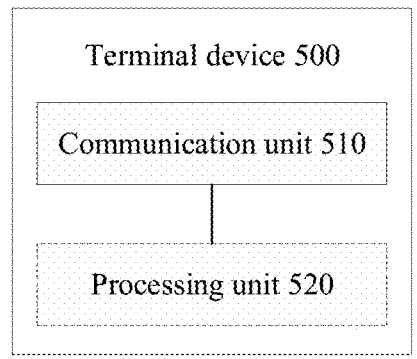
FIG. 6 is a schematic block view of a terminal device according to another embodiment of the present disclosure.

FIG. 6 illustrates a schematic block view of a terminal device 500 according to embodiments of the present disclosure. As shown in FIG. 6, the terminal device 500 includes the following elements.

A communication unit 510 configured to send capability information to a network device. The capability information includes at least one of the followings.

At least one set of transmitting capability loss values, at least one set of receiving capability loss values, at least one set of blind detections per unit time for a control channel, and at least one set of channel estimations per unit time for a control channel element.

In some embodiments, the number of blind detections per unit time for the control channel is related to a frame structure parameter, and/or, the number of channel estimates per unit time for the control channel element is related to the frame structure parameter.

In some embodiments, the frame structure parameter is an SCS.

In some embodiments, the terminal device 500 further includes: a processing unit 520.

The communication unit 510 is further configured to receive configuration information sent by the network device, the configuration information being determined based on the capability information.

The processing unit 520 is configured to perform reception and/or detection of a signal according to the configuration information.

In some embodiments, the configuration information is configured to indicate the terminal device to enable at least one of the followings.

One of the at least one set of transmitting capability loss values, one of the at least one set of receiving capability loss values, one of the at least one set of blind detections per unit time for the control channel, and one of the at least one set of channel estimations per unit time for the control channel element.

In some embodiments, the configuration information is carried in a specific domain of DCI of the PDCCH; or, the configuration information is carried in RRC signaling.

In some embodiments, the communication unit may be a communication interface or transceiver, or an input-output interface of a communication chip or system-on-chip. The processing unit may be one or more processors.

It is to be understood that the terminal device 500 according to embodiments of the present disclosure may correspond to the terminal device in the method embodiments of the present disclosure, and that the above and other operations and/or functions of the various units in the terminal device 400 are respectively intended to implement the corresponding processes of the terminal device in the method 300 shown in FIG. 4, which will not be repeated herein for brevity.

Figure 7:
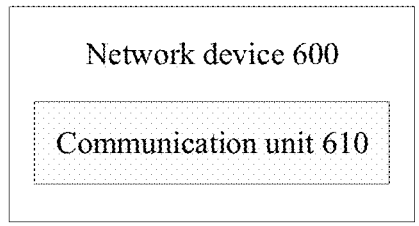
FIG. 7 is a schematic block view of a network device according to an embodiment of the present disclosure.

FIG. 7 illustrates a schematic block view of a network device 600 according to embodiments of the present disclosure. As shown in FIG. 7, the network device 600 belongs to a first network, and the network device 600 includes the following elements.

A communication unit 610 configured to broadcast first information, wherein the first information includes a capability level threshold and/or a type of a device prohibited or allowed to access the first network; the first information is configured to restrict access to the first network.

In some embodiments, the first information includes the capability level threshold.

The first information is specifically configured to indicate the terminal device to prioritize not to access the first network when the capability level is less than the capability level threshold, or the first information is configured to indicate the terminal device to expect the first network not to provide a service higher than the capability level of the terminal device when the capability level is less than the capability level threshold.

In some embodiments, the first information includes the capability level threshold, and the capability level threshold is defaulted.

When the capability level is less than the first capability level, the first information is configured to indicate the terminal device to prioritize not to access the first network, or the first information is configured to indicate the terminal device to expect the first network not to provide a service higher than the capability level of the capability level of the terminal device.

In some embodiments, the first capability level is information pre-configured at the terminal device.

In some embodiments, the first capability level is the highest capability level of the terminal device.

In some embodiments, the capability level includes at least one of the followings.

A gain level of a receiving antenna, a gain level of a transmitting antenna, a size level of the terminal device, a size level of the receiving antenna, and a size level of the transmitting antenna.

In some embodiments, the first information is MIB information or SIB information of a PBCH.

In some embodiments, the capability level threshold is indicated by at least one bit of an extended domain of the MIB information or the SIB information.

In some embodiments, the first information includes the type of device that is prohibited or allowed to access the first network.

The first information is specifically configured for the terminal device to determine whether to access the first network.

In some embodiments, the communication unit 610 is further configured to re-broadcast the first information when a first timer expires.

In some embodiments, the first timer is indicated by the first information, or the first timer is pre-configured for the terminal device by the network device.

In some embodiments, after the terminal device is connected to the first network, the communication unit 610 is further configured to receive capability information sent by the terminal device. The capability information may include at least one of the followings.

At least one set of transmitting capability loss values, at least one set of receiving capability loss values, at least one set of blind detections per unit time for a control channel, and at least one set of channel estimations per unit time for a control channel element.

In response to the capability information, the communication unit 610 is further configured to send configuration information to the terminal device, the configuration information being configured for the terminal device to perform reception and/or detection of the signal.

In some embodiments, the number of blind detections per unit time for the control channel is related to a frame structure parameter, and/or, the number of channel estimates per unit time for the control channel element is related to the frame structure parameter.

In some embodiments, the frame structure parameter is an SCS.

In some embodiments, the configuration information is configured to indicate the terminal device to enable at least one of the followings.

One of the at least one set of transmitting capability loss values, one of the at least one set of receiving capability loss values, one of the at least one set of blind detections per unit time for the control channel, and one of the at least one set of channel estimations per unit time for the control channel element.

In some embodiments, the configuration information is carried in a specific domain of DCI of the PDCCH; or, the configuration information is carried in RRC signaling.

In some embodiments, the communication unit may be a communication interface or transceiver, or an input-output interface of a communication chip or system-on-chip. The processing unit may be one or more processors.

It is to be understood that the network device 600 according to embodiments of the present disclosure may correspond to the network device in embodiments of the methods of the present disclosure, and that the above and other operations and/or functions of the various units in the network device 600 are respectively intended to implement the corresponding processes of the network device in the method 200 shown in FIG. 3, which will not be repeated herein for brevity.

Figure 8:
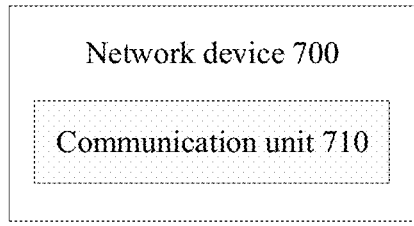
FIG. 8 is a schematic block view of a network device according to another embodiment of the present disclosure.

FIG. 8 illustrates a schematic block view of a network device 700 according to embodiments of the present disclosure. As shown in FIG. 8, the network device 700 includes the following elements.

A communication unit 710 configured to receive capability information sent by a terminal device. The capability information may include at least one of the followings.

At least one set of transmitting capability loss values, at least one set of receiving capability loss values, at least one set of blind detections per unit time for a control channel, and at least one set of channel estimations per unit time for a control channel element.

In response to the capability information, the communication unit 710 is further configured to send configuration information to the terminal device, the configuration information being configured for the terminal device to perform reception and/or detection of a signal.

In some embodiments, the number of blind detections per unit time for the control channel is related to a frame structure parameter, and/or, the number of channel estimates per unit time for the control channel element is related to the frame structure parameter.

In some embodiments, the frame structure parameter is an SCS.

In some embodiments, the configuration information is configured to indicate the terminal device to enable at least one of the followings.

One of the at least one set of transmitting capability loss values, one of the at least one set of receiving capability loss values, one of the at least one set of blind detections per unit time for the control channel, and one of the at least one set of channel estimations per unit time for the control channel element.

In some embodiments, the configuration information is carried in a specific domain of DCI of the PDCCH; or, the configuration information is carried in RRC signaling.

In some embodiments, the communication unit may be a communication interface or transceiver, or an input-output interface of a communication chip or system-on-chip. The processing unit may be one or more processors.

It is to be understood that the network device 700 according to embodiments of the present disclosure may correspond to the network device in the method embodiments of the present disclosure, and that the above and other operations and/or functions of the various units in the network device 700 are respectively intended to implement the corresponding processes of the network device in the method 300 shown in FIG. 4, which will not be repeated herein for brevity.

Figure 9:
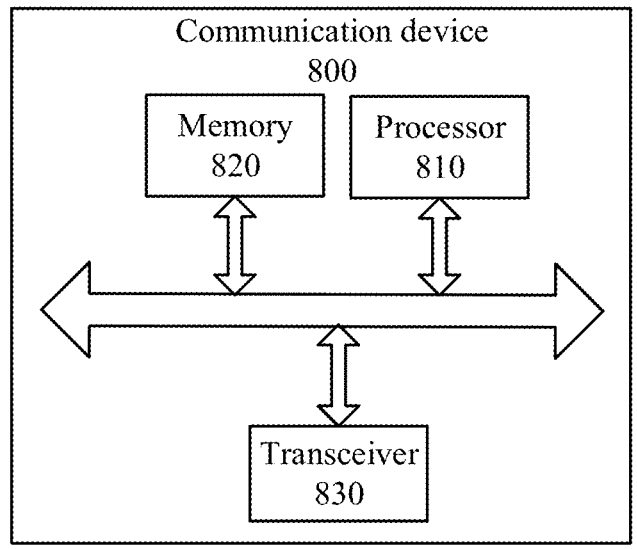
FIG. 9 is a schematic block view of a communication device according to an embodiment of the present disclosure.

FIG. 9 is a schematic structural view of a communication device 800 according to embodiments of the present disclosure. The communication device 800 includes a processor 810 capable of calling and running a computer program from a memory to implement the method in the embodiments of the present disclosure.

In some embodiments, as shown in FIG. 9, the communication device 800 may further include a memory 820. The processor 810 may call and run a computer program from the memory 820 to implement the method in embodiments of the present disclosure.

The memory 820 may be a separate device from the processor 810 or may be integrated into the processor 810.

In some embodiments, as shown in FIG. 9, the communication device 800 may further include a transceiver 830.

The processor 810 may control the transceiver to communicate with other devices, specifically, to send information or data to, or receive information or data from, the other devices.

The transceiver 830 may include a transmitter and a receiver. The transceiver 830 may further include an antenna, and the number of antennas may be one or more.

In some embodiments, the communication device 800 may specifically be the network device of the embodiments of the present disclosure, and the communication device 800 may implement the corresponding processes implemented by the network device in the various methods of the embodiments of the present disclosure, which will not be repeated herein for brevity.

In some embodiments, the communication device 800 may be a mobile terminal/terminal device of the embodiments of the present disclosure, and the communication device 800 may implement the corresponding processes implemented by the mobile terminal/terminal device in the various methods of the embodiments of the present disclosure, which will not be repeated herein for brevity.

Figure 10:
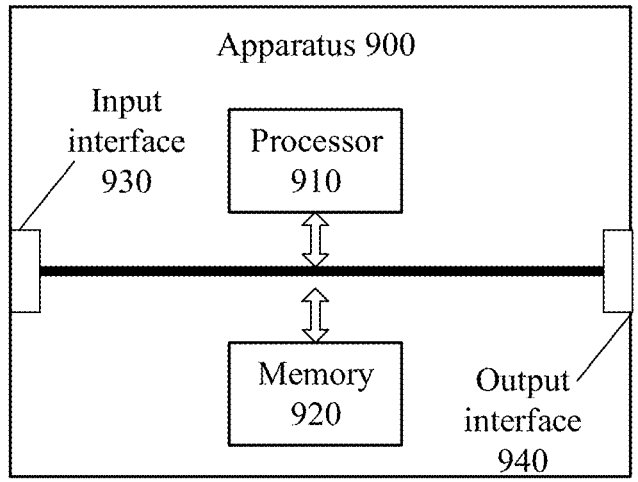
FIG. 10 is a schematic block view of an apparatus according to another embodiment of the present disclosure.

FIG. 10 is a schematic structure view of an apparatus of embodiments of the present disclosure. The apparatus 900 includes a processor 910 capable of calling and running a computer program from a memory to implement the method in the embodiments of the present disclosure.

In some embodiments, as shown in FIG. 10, the apparatus 900 may further include a memory 920. The processor 910 may call and run a computer program from the memory 920 to implement the method in embodiments of the present disclosure.

The memory 920 may be a separate device from the processor 910 or may be integrated in the processor 910.

In some embodiments, the apparatus 900 may further include an input interface 930. The processor 910 may control the input interface 930 to communicate with other devices or chips, specifically, to obtain information or data sent by the other devices or chips.

In some embodiments, the apparatus 900 may further include an output interface 940. The processor 910 may control the output interface 940 to communicate with other devices or chips, specifically, to output information or data to the other devices or chips.

In some embodiments, the apparatus may be applied to the network device in embodiments of the present disclosure, and the apparatus may implement the corresponding processes implemented by the network device in the various methods of embodiments of the present disclosure, which will not be repeated herein for brevity.

In some embodiments, the apparatus may be applied to the mobile terminal/terminal device in the embodiments of the present disclosure, and the device may implement the corresponding processes implemented by the mobile terminal/terminal device in the various methods of the embodiments of the present disclosure, which will not be described herein for brevity.

In some embodiments, the apparatus referred to in embodiments of the present disclosure may also be a chip. For example, it can be a system-level chip, system chip, chip system or system-on chip, etc.

Figure 11:
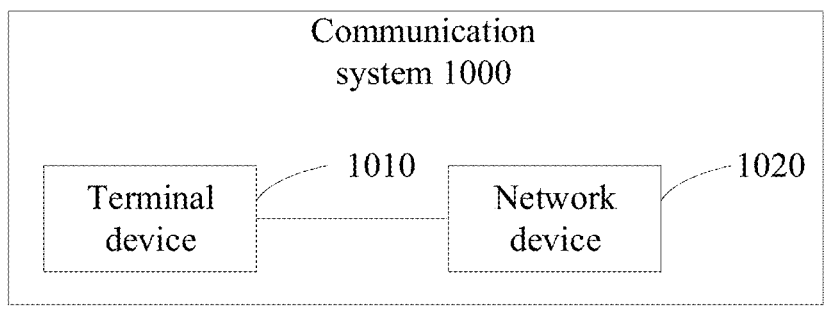
FIG. 11 is a schematic block view of a communication system according to another embodiment of the present disclosure.

FIG. 11 is a schematic block view of a communication system 1000 according to embodiments of the present disclosure. As shown in FIG. 11, the communication system 1000 includes a terminal device 1010 and a network device 1020.

The terminal device 1010 may be configured to implement the corresponding functions implemented by the terminal device in the method described above, and the network device 1020 may be configured to implement the corresponding functions implemented by the network device in the method described above, which will not be described herein for brevity.

It is to be understood that the processor of the embodiments of the present disclosure may be an integrated circuit chip having the processing capability of signals. In the process of implementation, the steps of the above method embodiments may be accomplished by integrated logic circuitry in the hardware of the processor or instructions in the form of software. The above processor may be a general-purpose processor, a digital signal processor (DSP), an application specific integrated circuit (ASIC), a field programmable gate array (FPGA) or other programmable logic device, discrete gate or transistor logic device, or discrete hardware component. The respective methods, steps, and logic block diagrams in the embodiments of the present disclosure may be implemented or performed. The general-purpose processor may be a microprocessor or the processor may also be any conventional processor, etc. The steps of the method disclosed in conjunction with the embodiments of the present disclosure may be directly embodied as performed by the hardware decode processor or performed with a combination of hardware and software modules in the decode processor. The software module may be in random memory, flash memory, read-only memory, programmable read-only memory or electrically rewritable programmable memory, registers, and other storage medium well established in the art. The storage medium is in the memory and the processor reads information in the memory and completes the steps of the above method in combination with the hardware.

It is to be understood that the memory in embodiments of the present disclosure may be volatile memory or non-volatile memory or may include both volatile and non-volatile memory. Among them, the non-volatile memory may be read-only memory (ROM), programmable ROM (PROM), erasable PROM (EPROM), electrically EPROM (EEPROM), or flash memory. The volatile memory may be random access memory (RAM), which is used as an external cache. By way of illustration, but not limitation, many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM), and direct Rambus RAM (DR RAM). It should be noted that the memory of the systems and methods described herein are intended to include, but are not limited to, these and any other suitable types of memories.

It is to be understood that the above memories are exemplary but not limiting descriptions, for example, the memory in the embodiments of the present disclosure may also be static RAM (SRAM), dynamic RAM (DRAM), synchronous DRAM (SDRAM), double data rate SDRAM (DDR SDRAM), enhanced SDRAM (ESDRAM), synchronous link DRAM (SLDRAM), and direct Rambus RAM (DR RAM), etc. That is, the memory in the embodiments of the present disclosure is intended to include, but is not limited to, these and any other suitable types of memories.

Embodiments of the present disclosure further provide a computer-readable storage medium for storing a computer program.

In some embodiments, the computer-readable storage medium may be applied to the network device in the embodiments of the present disclosure, and the computer program causes the computer to perform the corresponding processes implemented by the network device in the various methods of embodiments of the present disclosure, which will not be described herein for brevity.

In some embodiments, the computer-readable storage medium may be applied to the mobile terminal/terminal device in the embodiments of the present disclosure, and the computer program causes the computer to perform the corresponding processes implemented by the mobile terminal/terminal device in the various methods of the embodiments of the present disclosure, which will not be repeated herein for the sake of brevity.

Embodiments of the present disclosure further provide a computer program product including a computer program instruction.

In some embodiments, the computer program product may be applied to the network device in the embodiments of the present disclosure, and the computer program instruction causes the computer to perform the corresponding processes implemented by the network device in the respective methods of the embodiments of the present disclosure, which will not be repeated herein for brevity.

In some embodiments, the computer program product may be applied to the mobile terminal/terminal device in the embodiments of the present disclosure, and the computer program instruction causes the computer to perform the corresponding processes implemented by the mobile terminal/terminal device in the respective methods of the embodiments of the present disclosure, which will not be repeated herein for the sake of brevity.

Embodiments of the present disclosure further provide a computer program.

In some embodiments, the computer program may be applied to the network device in the embodiments of the present disclosure, and when the computer program is executed on the computer, the computer program causes the computer to perform the corresponding processes implemented by the network device in the respective methods of the embodiments of the present disclosure, which will not be repeated herein for brevity.

In some embodiments, the computer program may be applied to the mobile terminal/terminal device in the embodiments of the present disclosure, and when the computer program is executed on the computer, the computer program causes the computer to perform the corresponding processes implemented by the mobile terminal/terminal device in the various methods of the embodiments of the present disclosure, which will not be repeated herein for brevity.

Those skilled in the art can realize that the units and algorithmic steps of each example described in conjunction with the embodiments disclosed herein are capable of being implemented as electronic hardware, or a combination of computer software and electronic hardware. Whether these functions are performed in hardware or software depends on particular applications and design constraints of the technical solution. Those skilled in the art may use different methods to implement the described functions for each particular application, but such implementations should not be considered outside the scope of the present disclosure.

It will be clear to those skilled in the art that for the convenience and brevity of the description, the specific working processes of the systems, devices and units described above can be referred to the corresponding processes in the preceding method embodiments and will not be repeated herein.

In several embodiments provided by the present disclosure, it is to be understood that the disclosed systems, devices, and methods, may be implemented in other ways. For example, the embodiments of the devices described above are merely schematic, for example, the division of the units described, which is only a logical functional division, may be divided in other ways when implemented; for example, multiple units or components may be combined or integrated into another system, or some features may be ignored, or not implemented. In addition, the mutual coupling or direct coupling or communication connections shown or discussed may be indirect coupling or communication connections through some interface, device or unit, which can be electrical, mechanical or other forms.

The units illustrated as separate components may or may not be physically separated, and components shown as units may or may not be physical units, i.e., they may be located in one place or may be distributed to a plurality of network units. Some or all of these units may be selected according to practical needs to achieve the purpose of the present disclosure.

In addition, each functional unit in each embodiment of the present disclosure may be integrated in a single processing unit, or each unit may be physically present separately, or two or more units may be integrated in a single unit.

The functions, when implemented as a software functional unit and sold or used as a separate product, may be stored in a computer-readable storage medium. It is understood that the technical solution of the present disclosure, or that part of the technical solution that essentially contributes to the prior art, may be embodied in the form of a software product that is stored in a storage medium and includes a number of instructions to cause a computer device (which may be a personal computer, server, or network device, etc.) to perform all or some of the steps of the method described in various embodiments of the present disclosure. The storage medium includes USB flash drive, removable hard disk, read-only memory (ROM), random access memory (RAM), disk or CD-ROM, and other medium that can store program code.

The foregoing is only a specific implementation of the present disclosure, but the scope of the present disclosure is not limited thereto, and any changes or substitutions that can be readily thought of by those skilled in the art within the scope of the technology disclosed in the present disclosure shall be covered by the scope of the present disclosure. Therefore, the scope of the present disclosure shall be stated to be subject to the scope of the claims.

What is claimed is:

1. A wireless communication method, comprising:
   receiving, by a terminal device, first information broadcast by a first network;
   wherein the first information comprises a capability level threshold and/or a type of a device prohibited or allowed to access the first network;
   wherein the first information is configured to restrict access to the first network;
   wherein the terminal device is a reduced capability terminal and has a capability level; and the capability level comprises at least one of: a gain level of a receiving antenna of the terminal device, a gain level of a transmitting antenna of the terminal device, a size level of the receiving antenna of the terminal device, a size level of the transmitting antenna of the terminal device, and a processing capability of maximum bandwidth at a frequency point where the terminal device is located.

2. The method according to claim 1, wherein the first information comprises the capability level threshold, and the capability level threshold is defaulted;
   wherein the method further comprises:
   prioritizing, by the terminal device, not to access the first network, or expecting, by the terminal device, the first network not to provide a service higher than the capability level of the terminal device, in response to the capability level of the terminal device being less than a first capability level.

3. The method according to claim 1, wherein the first information comprises the type of the device prohibited or allowed to access the first network;
   wherein the method further comprises:
   determining, by the terminal device, whether to access the first network according to the first information.

4. The method according to claim 1, further comprising:
   sending, by the terminal device, capability information to a network device in the first network after the terminal device is connected to the first network; wherein the capability information is used for reporting that the terminal device is performance reduced.

5. The method according to claim 4, wherein the capability information comprises at least one of:
   at least one set of transmitting capability loss values, at least one set of receiving capability loss values, at least one set of blind detections per unit time for a control channel, and at least one set of channel estimations per unit time for a control channel element.

6. The method according to claim 4, further comprising:
   receiving, by the terminal device, configuration information sent by the network device, the configuration information being determined based on the capability information; and
   receiving and/or detecting, by the terminal device, a signal according to the configuration information.

7. The method according to claim 6, wherein the configuration information is carried in a specific domain of downlink control information (DCI) of a physical downlink control channel (PDCCH); or, the configuration information is carried in a radio resource control (RRC) signaling.

8. A terminal device, comprising:
   a processor and a memory;
   wherein the memory is configured to store a computer program, which when executed by the processor, causes the processor to:
   receive first information broadcast by a first network;
   wherein the first information comprises a capability level threshold and/or a type of a device prohibited or allowed to access the first network;
   wherein the first information is configured to restrict access to the first network;
   wherein the terminal device is a reduced capability terminal and has a capability level; and the capability level comprises at least one of: a gain level of a receiving antenna of the terminal device, a gain level of a transmitting antenna of the terminal device, a size level of the receiving antenna of the terminal device, a size level of the transmitting antenna of the terminal device, and a processing capability of maximum bandwidth at a frequency point where the terminal device is located.

9. The terminal device according to claim 8, wherein the first information comprises the type of the device prohibited or allowed to access the first network;
   wherein the computer program, when executed by the processor, further causes the processor to:

determine, by the terminal device, whether to access the first network according to the first information.

10. The terminal device according to claim 8, wherein the computer program, when executed by the processor, further causes the processor to:
send, by the terminal device, capability information to a network device in the first network after the terminal device is connected to the first network;
wherein the capability information is used for reporting that the terminal device is performance reduced.

11. The terminal device according to claim 10, wherein the capability information comprises at least one of:
at least one set of transmitting capability loss values, at least one set of receiving capability loss values, at least one set of blind detections per unit time for a control channel, and at least one set of channel estimations per unit time for a control channel element.

12. The terminal device according to claim 10, wherein the computer program, when executed by the processor, further causes the processor to:
receive, by the terminal device, configuration information sent by the network device, the configuration information being determined based on the capability information; and
receive and/or detect, by the terminal device, a signal according to the configuration information.

13. The terminal device according to claim 12, wherein the configuration information is carried in a specific domain of downlink control information (DCI) of a physical downlink control channel (PDCCH); or, the configuration information is carried in a radio resource control (RRC) signaling.

14. A network device, comprising:
a processor and a memory;
wherein the memory is configured to store a computer program, which when executed by the processor, causes the processor to:
broadcast, by the network device in a first network, first information to a terminal device;
wherein the first information comprises a capability level threshold and/or a type of a device prohibited or allowed to access the first network;
wherein the first information is configured to restrict access to the first network;
wherein the terminal device is a reduced capability terminal and has a capability level; and the capability level comprises at least one of: a gain level of a receiving antenna of the terminal device, a gain level of a transmitting antenna of the terminal device, a size level of the receiving antenna of the terminal device, a size level of the transmitting antenna of the terminal device, and a processing capability of maximum bandwidth at a frequency point where the terminal device is located.

15. The network device according to claim 14, wherein the first information comprises the type of the device prohibited or allowed to access the first network;
wherein the first information is configured for the terminal device to determine whether to access the first network.

16. The network device according to claim 14, wherein the computer program, when executed by the processor, further causes the processor to:
receive, by the network device, capability information sent by the terminal device after the terminal device is connected to the first network;
wherein the capability information is used for reporting that the terminal device is performance reduced.

17. The network device according to claim 16, wherein the capability information comprises at least one of:
at least one set of transmitting capability loss values, at least one set of receiving capability loss values, at least one set of blind detections per unit time for a control channel, and at least one set of channel estimations per unit time for a control channel element.

18. The network device according to claim 16, wherein the computer program, when executed by the processor, further causes the processor to:
send, by the network device, configuration information to the terminal device in response to the capability information, the configuration information being determined based on the capability information; wherein the configuration information is configured for the terminal device to receive and/or detect of a signal.

19. The network device according to claim 18, wherein the configuration information is carried in a specific domain of downlink control information (DCI) of a physical downlink control channel (PDCCH); or, the configuration information is carried in a radio resource control (RRC) signaling.

* * * * *